(12) United States Patent
Omura et al.

(10) Patent No.: US 7,317,607 B2
(45) Date of Patent: Jan. 8, 2008

(54) ELECTRIC DOUBLE LAYER CAPACITOR

(75) Inventors: Seiji Omura, Daito (JP); Hiroshi Nakajima, Hirakata (JP)

(73) Assignee: Sanyo Electric Co., Ltd., Osaka (JP)

(*) Notice: Subject to any disclaimer, the term of this patent is extended or adjusted under 35 U.S.C. 154(b) by 0 days.

(21) Appl. No.: 10/576,251

(22) PCT Filed: Sep. 27, 2004

(86) PCT No.: PCT/JP2004/014548

§ 371 (c)(1),
(2), (4) Date: Apr. 18, 2006

(87) PCT Pub. No.: WO2005/038835

PCT Pub. Date: Apr. 28, 2005

(65) Prior Publication Data

US 2007/0081298 A1    Apr. 12, 2007

(30) Foreign Application Priority Data

Oct. 20, 2003   (JP)   .............................. 2003-359636

(51) Int. Cl.
*H01G 9/00* (2006.01)
(52) U.S. Cl. ...................................... 361/502; 361/503
(58) Field of Classification Search ......... 361/502–503
See application file for complete search history.

(56) References Cited

U.S. PATENT DOCUMENTS 5,428,501 A * 6/1995 Bruder ........................ 361/535
5,953,204 A * 9/1999 Suhara et al. ................ 361/502
6,275,371 B1 * 8/2001 Yoshio et al. ................ 361/502

FOREIGN PATENT DOCUMENTS

| JP | 57-53923 | 3/1982 |
| JP | 58-206116 | 12/1983 |
| JP | 61-203614 | 9/1986 |
| JP | 2-25164 | 2/1990 |
| JP | 8-222485 | 8/1996 |
| JP | 11-067609 | 3/1999 |
| JP | 11-219868 | 8/1999 |
| JP | 2000-306783 | 11/2000 |

OTHER PUBLICATIONS

International Search Report of PCT/JP2004/014548, dated Dec. 16, 2004.

* cited by examiner

*Primary Examiner*—Eric Thomas
(74) *Attorney, Agent, or Firm*—Westerman, Hattori, Daniels & Adrian, LLP.

(57) ABSTRACT

In an electric double layer capacitor including two plate-like polarizable electrodes stacked in layers via a separator and constituted by housing these in an outer packaging member, a contact area between a first polarizable electrode and the separator is different from a contact area between a second polarizable electrode and the separator, and the polarizable electrode with a smaller contact area is formed thicker than the polarizable electrode with a larger contact area. In addition, it is preferable that the first polarizable electrode and the second polarizable electrode have a generally equal volume.

3 Claims, 2 Drawing Sheets

ELECTRIC DOUBLE LAYER CAPACITOR

TECHNICAL FIELD

The present invention relates to an electric double layer capacitor in which two polarizable electrodes opposed via a separator are impregnated with an electrolyte.

BACKGROUND ART

A coin-shaped electric double layer capacitor as shown in FIG. 2 has been conventionally known. This electric double layer capacitor includes two polarizable electrodes 1, 2 and a separator 3 intervening therebetween and impregnated with an electrolyte, which are housed in an outer packaging lid 4a and an outer packaging case 4b. A first polarizable electrode 1 is connected via a current collector 5 to the outer packaging lid 4a, while a second polarizable electrode 2 is connected via a current collector 6 to the outer packaging case 4b. The outer packaging lid 4a is caulked for sealing into the outer packaging case 4b via a gasket 7 for electrical insulation. The outer packaging lid 4a has a lower portion 41a formed with a diameter larger than that of an upper portion 40a in order to be easily caulked into the outer packaging case 4b via the gasket 7.

For electrodes used in a battery such as a lithium battery, a positive pole (cathode) and a negative pole (anode) are produced from different materials and therefore have different capacities per volume, so that the positive pole and the negative pole used therein are different in volume in order to balance the capacities. However, with the electric double layer capacitor as described above, the first polarizable electrode and the second polarizable electrode are formed from the same material and therefore have a generally equal capacity per volume. The same shape is also used because of good productivity and low production costs.

With the above-described coin-shaped electric double layer capacitor, the first polarizable electrode 1 has a diameter defined such that the first polarizable electrode can be contained in the upper portion 40a of the outer packaging lid 4a. The second polarizable electrode 2 also has the same size diameter. This has been causing a problem of useless space around the second polarizable electrode 2 arranged in the lower portion 41a, which has a diameter defined larger than that of the upper portion 40a.

As a method for solving the above-described problem, there has been proposed a so-called bottom-laid structure in which, as shown in FIG. 3, the second polarizable electrode 2 is expanded circumferentially until it almost reaches the inner peripheral surface of the outer packaging case 4b (this is called a bottom-laid structure because the second polarizable electrode is arranged below the gasket) (see JP 11-67609 A).

When a voltage is applied to the electric double layer capacitor, cations and anions in the electrolyte are attracted to the first polarizable electrode and the second polarizable electrode, respectively. The capacitance of the electric double layer capacitor depends on how many ions the respective polarizable electrodes can attract. With the electric double layer capacitor of the above-described bottom-laid structure in which the second polarizable electrode 2 is expanded circumferentially as shown in FIG. 3, only the second polarizable electrode 2 provides an increased ion attraction amount, while the first polarizable electrode 1 provides an unchanged ion attraction amount. This has been preventing the capacitance from greatly increasing.

In view of the above-described problems, the present invention provides an electric double layer capacitor in which the useless space around the polarizable electrode is effectively utilized, and the capacitance increases more than in the conventional products.

DISCLOSURE OF THE INVENTION

The present invention provides an electric double layer capacitor comprising two plate-like polarizable electrodes stacked in layers via a separator, the electric double layer capacitor being constituted by housing the electrodes and separator in an outer packaging lid and an outer packaging case, the outer packaging lid having an upper portion and a lower portion with a diameter defined larger than that of the upper portion, wherein a contact area between a first polarizable electrode arranged above in the outer packaging lid and the outer packaging case and the separator is different from a contact area between a second polarizable electrode arranged lower than the first polarizable electrode and the separator, and the first polarizable electrode is thicker than the second polarizable electrode.

In addition, it is preferable that the first polarizable electrode and the second polarizable electrode have a generally equal volume. Furthermore, it is preferable that the contact area between the second polarizable electrode and the separator and the contact area between the first polarizable electrode and the separator have a relative ratio of 10:8 to 10:5.

BEST MODE FOR CARRYING OUT THE INVENTION

Figure 1:
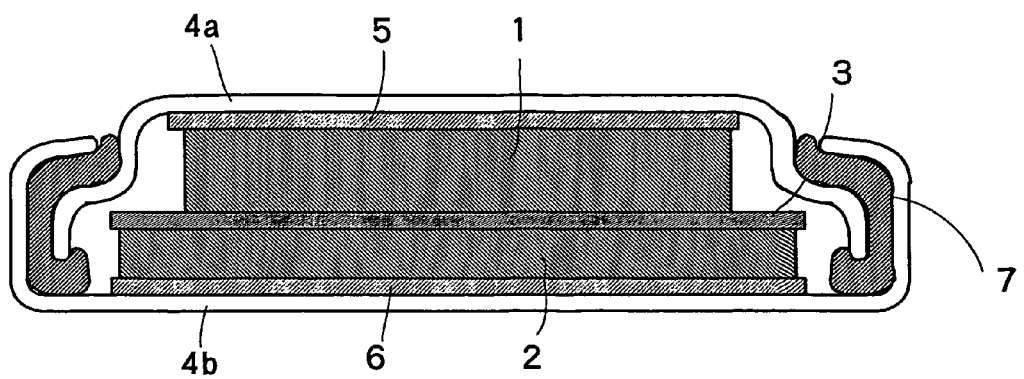
FIG. 1 is a sectional view of an electric double layer capacitor in an embodiment of the present invention.
Figure 2:
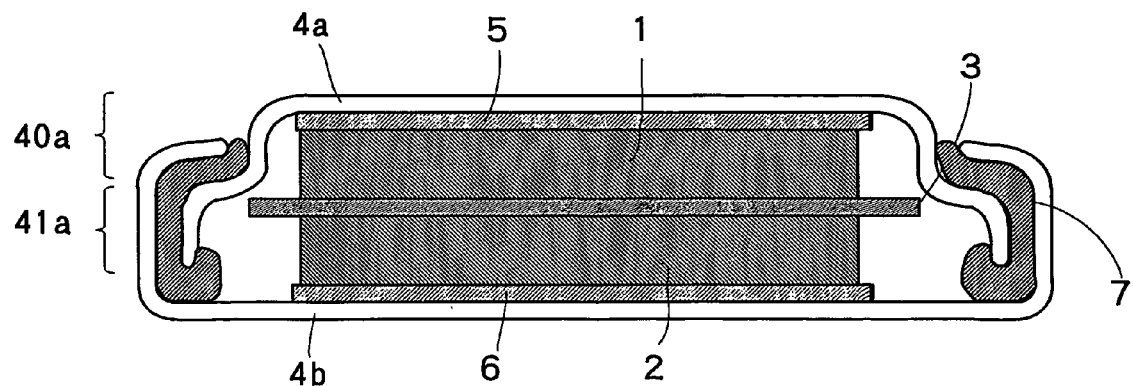
FIG. 2 is a sectional view of a conventional electric double layer capacitor.
Figure 3:
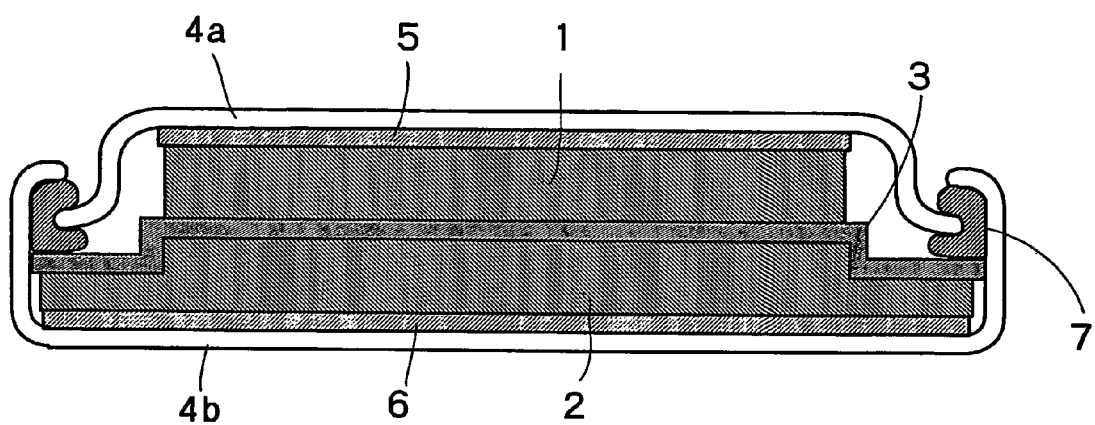
FIG. 3 is a conventional electric double layer capacitor of a bottom-laid structure.

An embodiment of the present invention will be described below with reference to the drawing.

As shown in FIG. 1, an electric double layer capacitor of the present invention includes a first polarizable electrode 1, a second polarizable electrode 2, and a separator 3 intervening therebetween and impregnated with an electrolyte, which are housed in an outer packaging lid 4a and an outer packaging case 4b. The first polarizable electrode 1 is connected via a current collector 5 to the outer packaging lid 4a, while the second polarizable electrode 2 is connected via a current collector 6 to the outer packaging case 4b. The outer packaging lid 4a is caulked for sealing into the outer packaging case 4b via a gasket 7 for electrical insulation.

The first polarizable electrode 1 and the second polarizable electrode 2 of the above-described electric double layer capacitor of the present invention include an active material and a binder. A conductive agent may be added if the active material has a low conductivity. Usable as the active material is a powdered activated carbon obtained by activating sawdust, coconut husks, pitch, etc. Also usable is an activated carbon or an activated carbon fiber obtained by infusibilizing and carbonizing/activating a phenolic, rayon-based, acrylic, or pitch-based fiber or the like and forming this into a felt, thread, sheet, or sintered form. Further usable are a carbon material such as a carbon nanotube and a metal compound. Usable as the binder is a known material commonly used in electric double layer capacitors such as polytetrafluoroethylene, polyvinylidene fluoride, polyvinyl pyrrolidone, polyvinyl chloride, polyethylene, polypropylene, polyfluoroethylenepropylene, styrene-butadiene rubbers, carboxymethylcellulose, fluororubbers, etc. Usable as the conductive agent is a known material commonly used in electric double layer capacitors such as natural graphite such as scaly graphite and earthy graphite, synthetic graphite, carbon black, acetylene black, carbon fibers, etc.

Usable as the separator 3 is an insulating film having high ion permeability and predetermined mechanical strength, made of glass fibers or a resin such as polyphenylene sulfide, polyethylene terephthalate, polyamides, polyimides, etc. The separator may have any pore diameter within a range commonly used for capacitors with an example being 0.01-10 μm. The separator 3 may have any commonly used thickness with an example being 5-150 μm.

The plate-like polarizable electrodes 1, 2 used for the present invention are formed to have generally parallel upper and lower surfaces with a surface to contact the separator 3 being an upper surface, and may be formed, for example, with the upper surface or the lower surface partially having projections or depressions, or to have a shape of a rectangle, circle, ellipse, star, etc. when viewed from the upper surface.

As a result of repeated experiments for a relationship of the capacitance to shapes and opposed areas of the polarizable electrodes used for in the electric double layer capacitor, the present applicants have found that when one polarizable electrode with an increased thickness and the other polarizable electrode with an increased contact area with the separator are stacked in layers via the separator, the capacitance of the capacitor remains almost unchanged although the contact area between the one polarizable electrode and the separator is different from the contact area between the other polarizable electrode and the separator. Applying this, the present invention enables the space inside the outer packaging member to be effectively utilized and the capacitance to increase by adjusting the thickness of the first polarizable electrode 1 and the second polarizable electrode 2, the contact area between the first polarizable electrode 1 and the separator 3, and the contact area between the second polarizable electrode 2 and the separator 3. In Examples, the plate-like polarizable electrodes 1, 2 were used having a circular shape when viewed from the upper surface in accordance with a contour of a coin can.

In addition, for the polarizable electrodes used for the present invention, it is preferable that the contact area between the second polarizable electrode 2 and the separator 3 and the contact area between the first polarizable electrode 1 and the separator 3 have a relative ratio of 10:8 to 10:5. If it is more than 10:5, there will be too much resistance between the polarizable electrodes, while if it is less than 10:8, the useless space inside the outer packaging member cannot be effectively utilized. This makes it difficult to obtain a great effect of improved capacitance. Specifically, it is further preferable to fall within a range of 10:7 to 10:6, which makes it possible to obtain a significant effect of improved capacitance.

Examples of the present invention will be described below. For Examples and comparative examples, the polarizable electrodes were prepared so as to have a thickness of 1 mm in total because the height of each electrode is compared within a limited space of the outer packaging lid 4a, the outer packaging case 4b, and the gasket 7. The polarizable electrode of the anode side described below is the second polarizable electrode 2 in FIG. 1, and the polarizable electrode of the cathode side is the first polarizable electrode 1.

EXAMPLE 1

An electric double layer capacitor was produced using a polarizable electrode of the anode side with a diameter of 2.4 mm and a thickness of 0.4 mm and a polarizable electrode of the cathode side with a diameter of 2.0 mm and a thickness of 0.6 mm.

EXAMPLE 2

An electric double layer capacitor was produced using a polarizable electrode of the anode side with a diameter of 2.4 mm and a thickness of 0.45 mm and a polarizable electrode of the cathode side with a diameter of 2.0 mm and a thickness of 0.55 mm.

COMPARATIVE EXAMPLE 1

An electric double layer capacitor was produced using polarizable electrodes of the anode and cathode sides each having a diameter of 2.0 mm and a thickness of 0.5 mm.

COMPARATIVE EXAMPLE 2

An electric double layer capacitor was produced using a polarizable electrode of the anode side with a diameter of 2.4 mm and a thickness of 0.5 mm and a polarizable electrode of the cathode side with a diameter of 2.0 mm and a thickness of 0.5 mm.

Table 1 shows the result of measurement for each capacitance for the electric double layer capacitors of Examples 1 and 2 and comparative examples 1 and 2.

TABLE 1

| | Contact Area with Separator and Thickness | | | | |
| --- | --- | --- | --- | --- | --- |
| | Polarizable Electrode (Anode) | | Polarizable Electrode (Cathode) | | |
| | Contact Area ($mm^2$) | Thickness (mm) | Contact Area ($mm^2$) | Thickness (mm) | Capacitance (mF) |
| Example 1 | 1.44π | 0.4 | π | 0.6 | 60.2 |
| Example 2 | 1.44π | 0.45 | π | 0.55 | 53.6 |
| Comparative Example 1 | π | 0.5 | π | 0.5 | 48.2 |
| Comparative Example 2 | 1.44π | 0.5 | π | 0.5 | 49.3 |

As seen in Table 1, the comparative example 2, which was produced such that only the contact area with the separator of the polarizable electrode of the anode side would increase, could only provide the capacitance similar to that of the comparative example 1 using the polarizable electrodes of the same shape. In contrast, the result that the capacitance is larger than that of the comparative examples 1 and 2 was obtained for Examples 1 and 2 using the thinner polarizable electrode of the anode side with the increased contact area with the separator and the cathode side with the increased thickness. Furthermore, the capacitance was able to be improved more greatly than in the comparative examples 1 and 2 in Example 1 where the contact area with the separator and the thickness were adjusted such that the electrodes have a generally same volume. This is probably because the polarizable electrodes used in the electric double layer capacitor are produced from an active material such as a powdered activated carbon, with the active material defining many fine pores, and the electrolyte is inserted into the fine pores, so that a substantive contact area improves and the attraction amount for ions depends on the volume of the polarizable electrodes.

Next, electric double layer capacitors for Examples 3-7 were produced using polarizable electrodes with various diameters and thicknesses such that each polarizable electrode of the anode side and polarizable electrode of the cathode side have a generally same volume. Table 2 shows the result of measurement for each capacitance.

TABLE 2

|  | Polarizable Electrode (Anode) | | | Polarizable Electrode (Cathode) | | | Contact Ratio with Separator of Anode and Cathode | Capacitance (mF) |
| --- | --- | --- | --- | --- | --- | --- | --- | --- |
|  | Diameter (mm) | Contact area (mm$^2$) | Thickness (mm) | Diameter (mm) | Contact Area (mm$^2$) | Thickness (mm) |  |  |
| Example 1 | 2.4 | 1.44π | 0.4 | 2 | π | 0.6 | 10:7 | 60.2 |
| Example 3 | 2.2 | 1.25π | 0.45 | 2 | π | 0.55 | 10:8 | 53.8 |
| Example 4 | 2.6 | 1.66π | 0.4 | 2 | π | 0.6 | 10:6 | 61.8 |
| Example 5 | 2.8 | 2π | 0.35 | 2 | π | 0.65 | 10:5 | 55.1 |
| Example 6 | 3 | 2.25π | 0.3 | 2 | π | 0.7 | 10:4 | 52.2 |
| Example 7 | 3.2 | 2.56π | 0.25 | 2 | π | 0.75 | 10:3 | 51.7 |
| Comparative Example 1 | 2 | π | 0.5 | 2 | π | 0.5 | 10:10 | 48.2 |

As seen in Table 2, the capacitance was able to increase more than in the comparative example 1 like in Example 1 also in Examples 3-7 where the contact area between the polarizable electrode of the anode side and the separator is different from the contact area between the polarizable electrode of the cathode side and the separator, and the polarizable electrode with a smaller contact area has a thickness thicker than a thickness of the polarizable electrode with a larger contact area. When like in Examples 6 and 7 the contact area between the polarizable electrode of the anode side and the separator and the contact area between the polarizable electrode of the cathode side and the separator have a relative ratio of not more than 10:4, there is too much resistance between the polarizable electrodes to provide a small capacitance increase effect. If it is not less than 10:9, the useless space cannot be effectively utilized. This makes it difficult to obtain a great effect of improved capacitance. Therefore, it is preferable that in the present invention the contact area between the polarizable electrode of the anode side and the separator and the contact area between the polarizable electrode of the cathode side and the separator have a relative ratio of 10:5 to 10:8. Specifically, it is further preferable to fall within a range of 10:6 to 10:7, which makes it possible to obtain a significant effect of improved capacitance.

In Examples described above, the polarizable electrode of the anode side was formed with a larger diameter and a thinner thickness, with the polarizable electrode of the cathode side being thicker. However, the same effect can be also obtained if the polarizable electrode of the cathode side is formed with a larger diameter and a thinner thickness, with the polarizable electrode of the anode side being thicker.

In Examples, the metal outer packaging lid 4a and outer packaging case 4b were used as the outer packaging member. However, without being limited to this, the outer packaging member may use an insulating resin such as a liquid crystal polymer (LCP), deformation polyamide or nylon resin, an insulating thermoplastic such as polyethylene terephthalate (PBT), polypropylene (PP) or polyphenylene sulfide (PPS), a ceramic such as alumina, or glass. If an outer packaging member made of an insulator is used, it is preferable to attach to the current collector a lead member made of an alloy or the like mainly containing Cu to be pulled outside the outer packaging member.

INDUSTRIAL APPLICABILITY

With the electric double layer capacitor of the present invention, the contact area between the first polarizable electrode and the separator is different from the contact area between the second polarizable electrode and the separator, and the polarizable electrode with a smaller contact area is formed thicker than the polarizable electrode with a larger contact area. Therefore, it is possible to effectively utilize the useless space around the polarizable electrode and increase the capacitance more than in the conventional products. In addition, the first polarizable electrode and the second polarizable electrode are formed to have a generally equal volume to thereby balance the attraction amount for cations and anions, allowing the capacitance to increase more than in the conventional products.

What is claimed is:

1. An electric double layer capacitor, comprising two plate-like polarizable electrodes stacked in layers via a separator, the electric double layer capacitor being constituted by housing the electrodes and separator in an outer packaging lid and an outer packaging case, the outer packaging lid having an upper portion and a lower portion with a diameter defined larger than that of the upper portion,
   wherein a contact area between a first polarizable electrode arranged above in the outer packaging lid and the outer packaging case and the separator is different from a contact area between a second polarizable electrode arranged lower than the first polarizable electrode and the separator, and the first polarizable electrode is thicker than the second polarizable electrode,
   wherein the first polarizable electrode and the second polarizable electrode have a generally equal volume.

2. The electric double layer capacitor according to claim 1,
   wherein the contact area between the second polarizable electrode and the separator and the contact area between the first polarizable electrode and the separator have a relative ratio of 10:8 to 10:5.

3. An electric double layer capacitor comprising two plate-like polarizable electrodes stacked in layers via a separator, the electric double layer capacitor being constituted by housing the electrodes and separator in an outer packaging lid and an outer packaging case, the outer packaging lid having an upper portion and a lower portion with a diameter defined larger than that of the upper portion, wherein a contact area between a first polarizable electrode arranged above in the outer packaging lid and the outer packaging case and the separator is different from a contact area between a second polarizable electrode arranged lower than the first polarizable electrode and the separator, and the first polarizable electrode is thicker than the second polarizable electrode, wherein the contact area between the second polarizable electrode and the separator and the contact area between the first polarizable electrode and the separator have a relative ratio of 10:8 to 10:5.

* * * * *